United States Patent [19]
Wu et al.

[11] Patent Number: 5,533,418
[45] Date of Patent: Jul. 9, 1996

[54] SPHERICAL ROBOTIC SHOULDER JOINT

[75] Inventors: Kung C. Wu, 6393 Los Robles Dr., El Paso, Tex. 79912; Rex Melgoza, El Paso, Tex.

[73] Assignee: Kung C. Wu, El Paso, Tex.

[21] Appl. No.: 353,460

[22] Filed: Dec. 9, 1994

[51] Int. Cl.$^6$ ................................................. B25J 17/02
[52] U.S. Cl. ................ 74/490.06; 74/665 C; 248/181.1; 248/663; 901/28; 901/29
[58] Field of Search ......................... 74/471 XY, 490.05, 74/490.06, 665 C; 248/181.1, 288.31, 481, 516, 663; 476/36; 901/28, 29

[56] References Cited

U.S. PATENT DOCUMENTS

| | | | |
|---|---|---|---|
| 1,410,370 | 3/1922 | Chesnutt | 362/421 X |
| 4,194,437 | 3/1980 | Rosheim | 92/120 |
| 4,296,681 | 10/1981 | Rosheim | 92/122 |
| 4,628,765 | 12/1986 | Dien et al. | 901/29 X |
| 4,804,220 | 2/1989 | Rosheim | 201/29 X |
| 4,878,393 | 11/1989 | Duta et al. | 901/29 X |
| 5,036,724 | 8/1991 | Rosheim | 901/29 X |
| 5,101,681 | 4/1992 | Shipgel | 901/28 X |
| 5,142,931 | 9/1992 | Menahem | 338/128 X |
| 5,301,566 | 4/1994 | Tahmasebi et al. | 901/14 X |

FOREIGN PATENT DOCUMENTS

| | | | |
|---|---|---|---|
| 1050112 | 1/1954 | France | 476/36 |
| WO87/04540 | 7/1987 | WIPO | |

OTHER PUBLICATIONS

"On the Kinematic Design of Spherical Three-Degree-of-Freedom Parallel Manipulators", Gosselin and Lavoie, 17th International Symposium on Industrial Robots, pp. 394–402, Apr. 26–30, 1987.

"Four New Robot Wrist Actuators", Rosheim, 16th International Symposium on Industrial Robots, pp. 8.1–8.45, Apr. 1986.

"New Nonsingular Robot Wrist Design", Milenkovic, 17th International Symposium on Industrial Robots, pp. 13.29–13.42 Apr. 26–30, 1987.

Primary Examiner—Allan D. Herrmann
Attorney, Agent, or Firm—John Vanden Bosche

[57] ABSTRACT

A two-degree-of-freedom spherical shoulder joint for a robot. The joint consists of a spherical ball member with gear teeth formed in its outer surface and three drive gears that mate with the gear teeth in the outer surface of the spherical member. The joint can rotate about any axis of rotation which lies within a plane defined by the contact points between the drive gears and the spherical member. By controlling the three drive gears to rotate by the proper amounts, the joint can be rotated about the desired axis of rotation. The inverse kinematics for controlling the joint are described.

20 Claims, 5 Drawing Sheets

SPHERICAL ROBOTIC SHOULDER JOINT

FIELD OF THE INVENTION

The invention relates generally to the field of robotic shoulder joints. More specifically it relates to a compact spherical joint with mechanical actuation.

BACKGROUND OF THE INVENTION

In recent years there has been interest in developing shoulder joints for robots. Shoulder joints approximate the motion of a human shoulder. These joints provide two degrees of freedom by rotating about more than one axis of rotation. The use of shoulder joints gives robots more flexibility of movement within a limited work envelope.

Previous attempts at shoulder joints have been hindered because of their complexity or bulkiness. Most attempts at shoulder joints can be described as roll-pitch-roll mechanisms. These joints use complicated mechanisms with many interlocking gears. Roll-pitch-roll joints tend to be very bulky and have many moving parts. They also suffer from singularity problems. There have been many variations of the roll-pitch-roll mechanism but all variations have been bulky and complex.

Another type of shoulder joint which has been attempted in the past is known as the parallel mechanism. Such a mechanism is described in the article entitled "On the Kinematic Design of Spherical Three-Degree-of-Freedom Parallel Manipulators", Clement M. Gosselin and Eric Lavoie, 17th International Symposium on Industrial Robots, Apr. 26, 1987. Parallel mechanisms use two pyramids with one vertex in common which defines the center of the joint. Prismatic actuators join the other corners of the two pyramids and moving the actuators rotates the joint about its center. Parallel mechanisms are limited by having a small work space and limited load carrying capacities.

Other attempts at shoulder joints include several hydraulic servo mechanisms by Mark Rosheim. These are described in U.S. Pat. Nos. 4,194,437 and 4,296,681. These joints suffer because their hydraulic actuation has a slow time constant and can present risk of explosion in certain environments.

Mark Rosheim has also disclosed a spherical joint with tendon actuation in U.S. Pat. No. 4,804,220. This joint also suffers from several problems. The inherent flexibility of the tendons reduces the rigidity of the joint and introduces vibration problems to the joints. Also, because the joint depends on friction between the tendons and the drive pulleys, the joint can only apply a limited force to an end effector.

Other shoulder joints, such as those described in U.S. Pat. No. 4,628,765 by Dien et al and U.S. Pat. No. 4,878,393 by Duta et al, essentially use a universal joint with two perpendicular axes of rotation. These joints are inherently weak and must use large actuators in order to carry a significant load.

SUMMARY OF THE INVENTION

The present invention uses a spherical joint to achieve a simple, light weight, compact shoulder joint which is capable of carrying large loads and which is easy to control.

The joint has a spherical member with gear teeth machined into its outer surface. There are three drive gears which mate with the gear teeth in the spherical member. The drive gears provide motion to the joint. The drive gears are in a horizontal plane and are arranged 120 degrees from each other about the spherical member. By moving the drive gears at the proper rates the joint can be rotated about any axis in the horizontal plane.

It is an objective of the present invention to provide a robotic shoulder joint which is compact and light weight.

It is a further objective of the present invention to provide a robotic shoulder joint which is of a simple design with few moving parts.

It is a further objective of the present invention to provide a robotic shoulder joint which is capable of carrying large loads.

It is a further objective of the present invention to provide a robotic shoulder joint which does not have any singularities within its envelope of operation.

It is a further objective of the present invention to provide a robotic shoulder joint which is easy to control.

The foregoing and further objects and advantages of the invention will be more fully understood from the following detailed description of the invention and from the accompanying drawings.

DETAILED DESCRIPTION OF THE INVENTION

Figure 1:
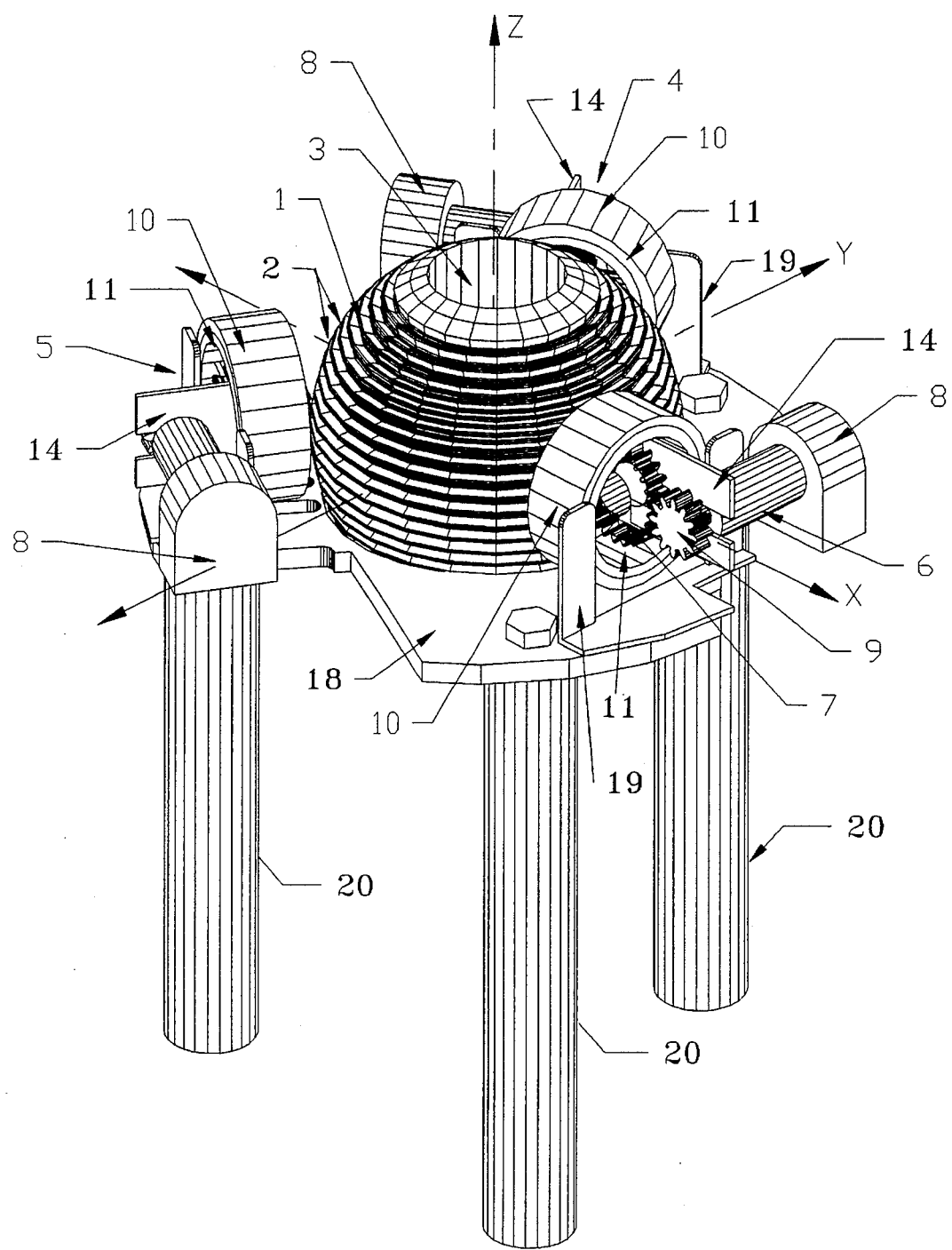
FIG. 1 is an isometric view of the robotic shoulder joint of the present invention.

The joint comprises a spherical ball member 1. The ball member 1 can be made of any material which can be machined. The spherical ball member 1 has gear teeth 2 cut into it around its circumference. The gear teeth 2 are preferably cut into the spherical member 1 in a spiral pattern. The reason why the gear teeth should be in a spiral pattern will be explained later.

The spherical member 1 also has a hole 3 drilled axially through its center. This hole provides a convenient place for mounting a robotic arm to the ball member. An additional actuator can be mounted within the axial hole to provide an additional degree of freedom to the robotic arm. For example, a robotic arm can be attached to the spherical member via a rotational or prismatic actuator so that the robotic arm can be rotated or translated in addition to the motion provided by the joint of the present invention.

The spherical member 1 is supported by and driven by three drive mechanisms 4, 5, 6. Each drive mechanism has a drive gear 7 which meshes with the gear teeth 2 on the spherical member. The points at which the drive gears 7 mesh with the gear teeth 2 on the spherical member define three contact points. The three contact points lie within a horizontal plane. The geometric center of the spherical member 1 lies within the same horizontal plane defined by the three contact points. The three drive gears 7 when placed at 120 degrees to each other are capable of supporting the ball member 1.

When the drive mechanisms 4, 5, 6 are held stationary, the drive gears 7 will hold the ball member 1 stationary. When the drive mechanisms 4, 5, 6 are driven, the spherical member 1 of the joint is rotated. The drive mechanisms 4, 5, 6 each have a stepper motor or DC servo motor 8 which can be controlled to independently drive a respective drive gear 7. The motion from motor 8 is transmitted through a transmission 9 to the respective drive gear 7.

When the drive mechanisms act together they can rotate the ball member 1 about its own geometric center and about any axis of rotation which lies within the horizontal plane defined by the contact points between the drive gears 7 and the spherical member 1.

Figure 2:
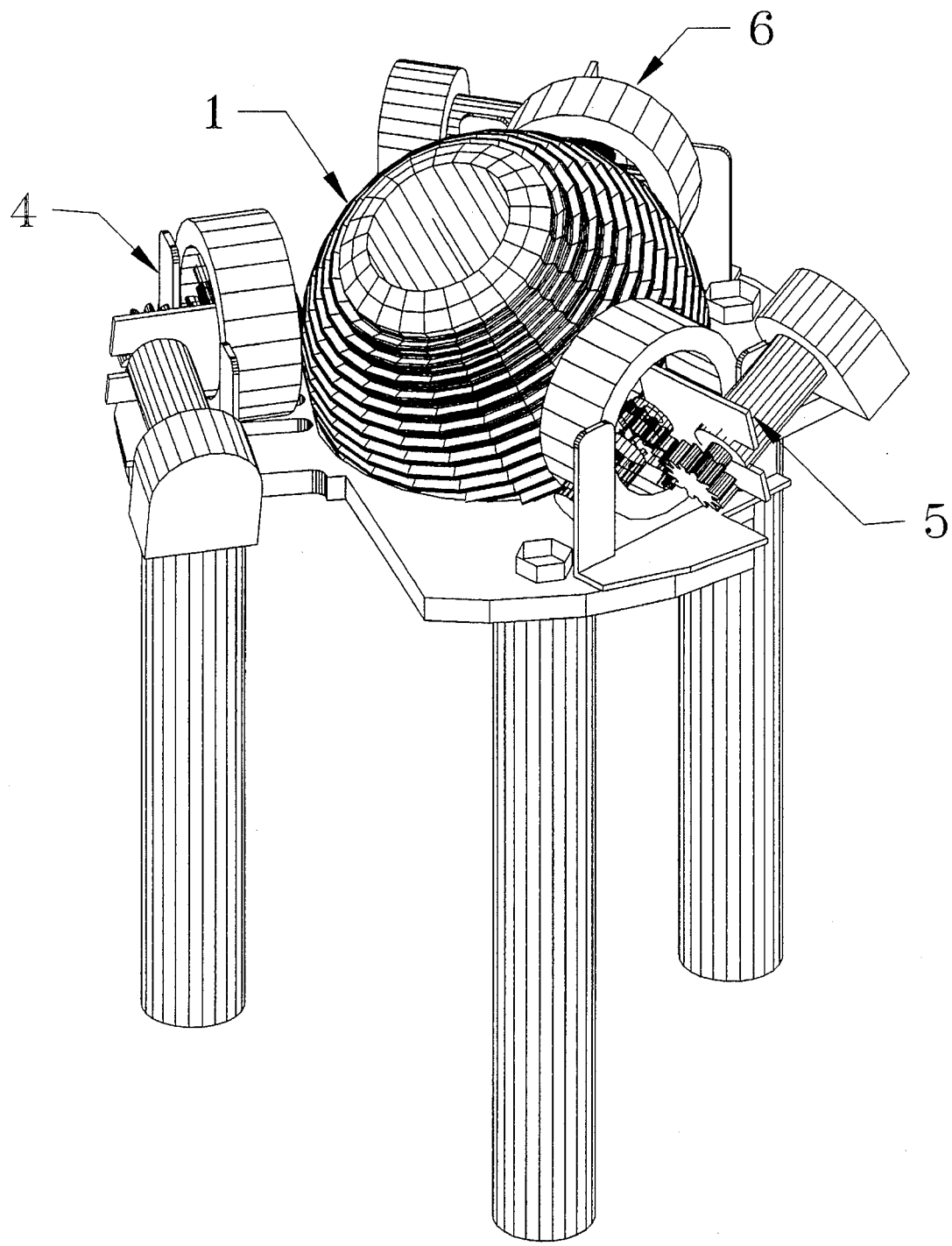
FIG. 2 is an isometric view of the robotic shoulder joint of the present invention showing a first rotated position of the joint.

If drive mechanism 5 is held stationary, drive mechanism 4 moves the periphery of ball member 1 downwards and drive mechanism 6 moves the periphery of ball member 1 upwards then the ball member will rotate about an axis which passes through drive mechanism 5 and the center of the spherical member. FIG. 2 shows the joint with the spherical member having been rotated about this axis of rotation.

Figure 3:
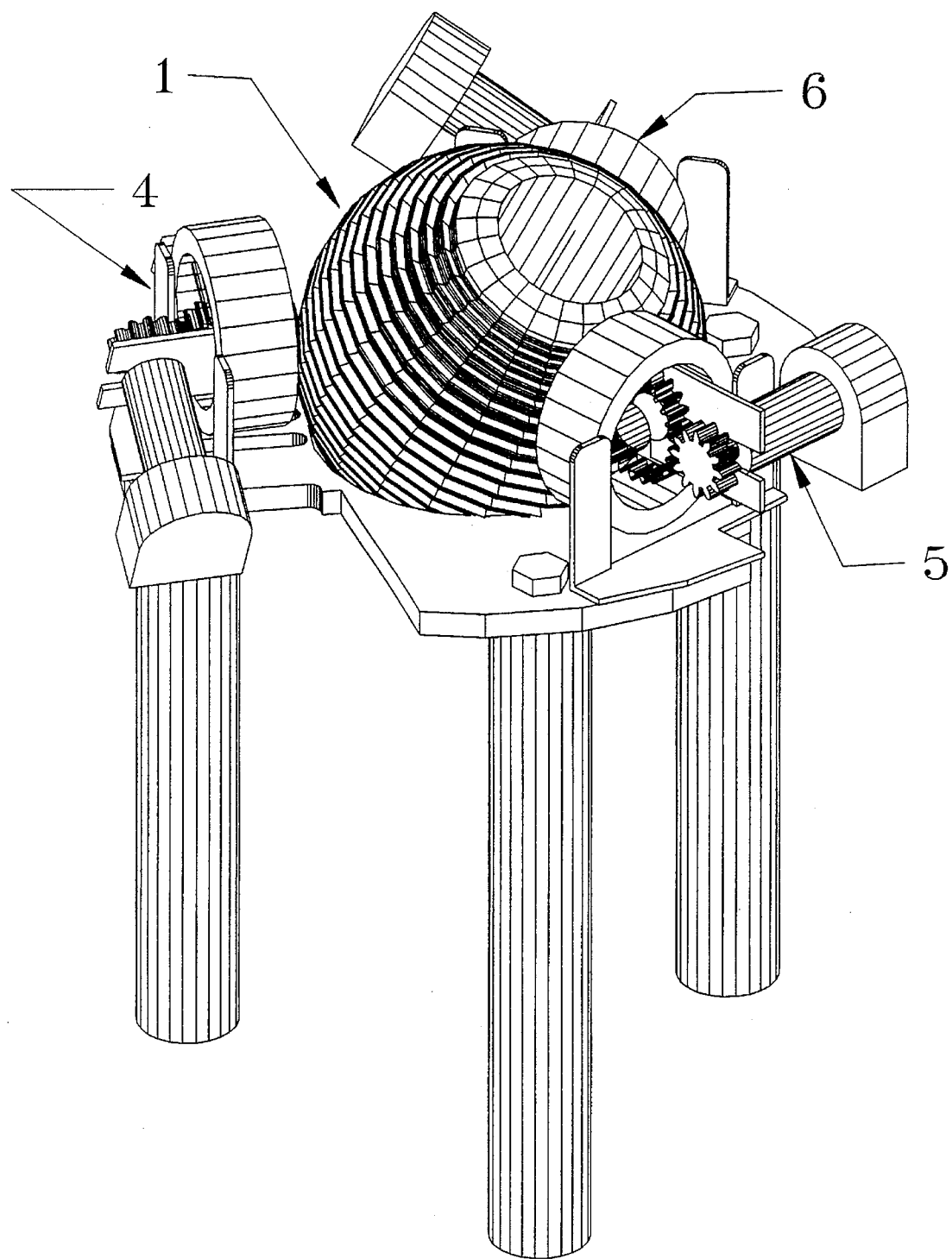
FIG. 3 is an isometric view of the robotic shoulder joint of the present invention showing a second rotated position of the joint.

If drive mechanism 5 moves the periphery of the ball member downwards and drive mechanisms 4 and 6 both move the periphery of ball member 1 upwards then the ball member will rotate about a second axis which is 90 degrees from the first axis described above. FIG. 3 shows the joint with the spherical member having been rotated about the second axis of rotation.

By providing the proper amounts of movement to each drive mechanism 4, 5, 6, it is possible to rotate the ball member about any axis in the horizontal plane in which the drive members lie. The necessary kinematics for determining the proper amount of movement in each drive mechanism will be described later.

As the spherical member 1 rotates about a given axis, the orientation of its teeth 2 will rotate away from a horizontal orientation. Therefore if the drive mechanisms 4, 5, 6 were rigidly mounted, the drive gears 7 would bind with the teeth 2 on ball member 1. The ball member 1 would then become stuck and possible damage could be caused to the joint. To alleviate this problem the drive mechanisms 4, 5, 6 are rotatably mounted. Housings 10 are rigidly mounted to a base 18 of the joint via mounting brackets 19 and the entire drive mechanism 4, 5, 6, including drive gear 7, motor 8, and transmission 9 are rotatably supported within the housings 10. In FIG. 2 and FIG. 3 the drive mechanisms can be seen to be rotated along with the spherical member. The drive mechanisms 4, 5, 6 may be supported in the housings 10 by bushings, bearings or other suitable means.

Figure 4:
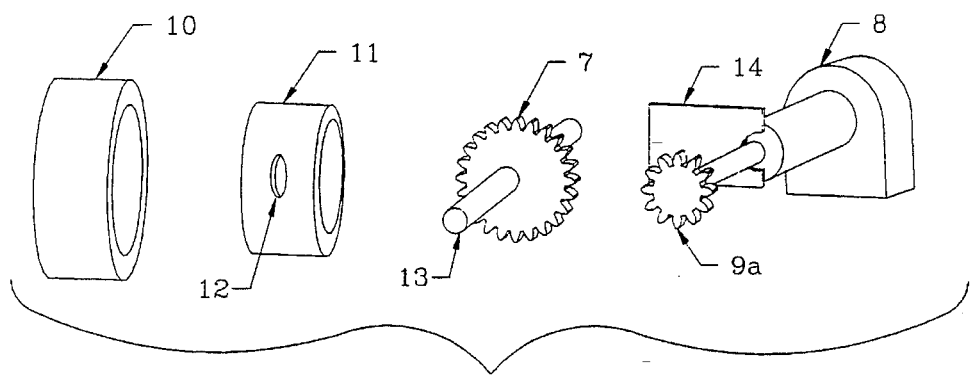
FIG. 4 is an exploded view of the drive mechanism of the present invention.

FIG. 4 shows the drive mechanism of the present invention in an exploded view. The drive mechanism has a housing 10 which is fixedly attached to the base of the joint. A bushing member 11 fits inside of housing 10 and is rotatable therein. Bushing member 11 could be held within housing 10 through direct contact or with ball bearings. It is important, however, that bushing member 11 be held in place in such a manner that it is capable of providing axial thrust loads so that the drive gear does not slip and lose contact with spherical member 1. Bushing member 11 has a mounting hole 12 drilled into its side for supporting the drive gear 7. Drive gear 7 is mounted on support axle 13 attached thereto which fits into mounting hole 12. Drive motor 8 is supported by mounting bracket 14. Mounting bracket 14 is rigidly attached to bushing member 11. Attached to the drive motor is a transmission gear 9a. Transmission gear 9a mates with drive gear 7 to provide motion thereto. When motor 8 turns, the transmission gear 9a is turned thereby turning drive gear 7. It can be seen from FIG. 4 that when bushing member 11 rotates within housing 10, the drive gear 7, transmission gear 9a and motor 8 will all rotate together with the bushing 11.

Figure 5:
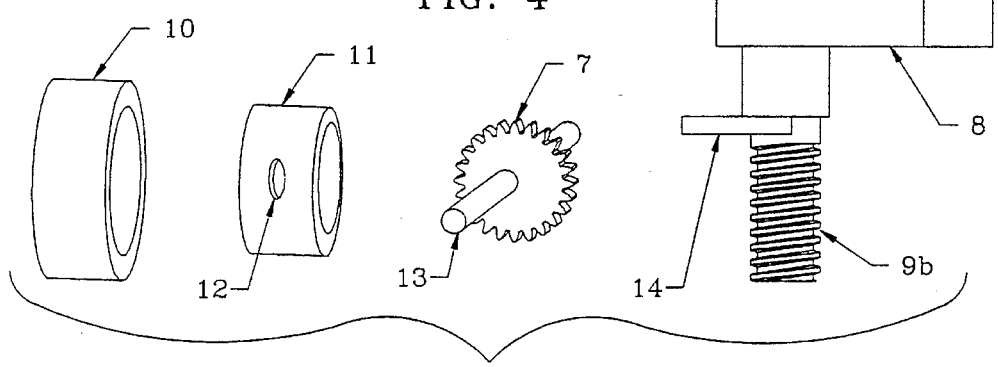
FIG. 5 is an exploded view of a second embodiment of the drive mechanism of the present invention.

FIG. 5 shows an alternate drive mechanism for the present invention in an exploded view. The drive mechanism of FIG. 5 is the same as that shown in FIG. 4 except that transmission gear 9b is a worm gear instead of a spur gear. In order to use a worm gear for transmission gear 9b it is necessary to attach mounting bracket 14 to bushing member 11 so that motor 8 is in a vertical orientation. When a worm gear is used in the transmission it has the effect of holding drive gear 7 and spherical member 1 very rigidly. The worm gears can be machined to a tight tolerance so that there is very little backlash within the system. In this embodiment of the drive mechanism, the drive motor 8 can be designed to be a smaller motor than if a spur gear is used for the transmission gear 9.

At this point a joint has been described which can be rotated about any axis in the horizontal plane defined by the contact points between the drive gears 7 and the spherical member 1. Thus by controlling the motion of the drive members 4, 5, 6 the spherical member 1 is constrained against rotation about any axis within that plane. However, if the gear teeth 2 were to be cut into spherical member 1 so that they are parallel to each other, the spherical member 1 would be unconstrained and free to rotate about a longitudinal axis which is perpendicular to the parallel teeth. The spherical member would be unconstrained because its gear teeth 2 could slip within the teeth of drive gears 7. However, if the gear teeth 2 are cut into the spherical member 1 in a spiral pattern, then the spherical member will be constrained about the longitudinal axis which is perpendicular to the plane containing the axes of rotation of the motors. The spherical member will be constrained because as the gear teeth 2 slip within the teeth of drive gears 7, the spherical member would be forced to move either upwards or downwards much the same as a bolt being turned within a nut. If the spherical member 1 is constrained against upwards and downwards movement and the gear teeth 2 are cut in a spiral pattern, then the spherical member 1 will be unable to rotate about the longitudinal axis and will be fully constrained.

Figure 6:
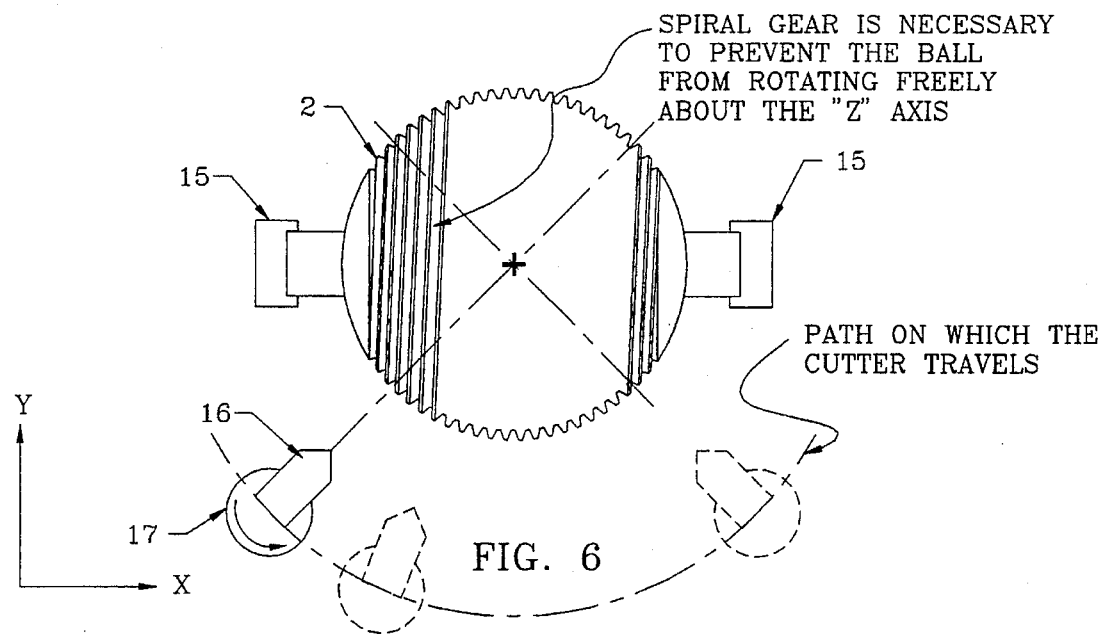
FIG. 6 is a schematic view of the machining setup used to form gear teeth in the spherical member of the present invention.

The preferred method for forming gear teeth 2 into the spherical member 1 is to turn them on a Computer Numerical Control (CNC) lathe. The setup for forming the gear teeth 2 is shown in FIG. 6. The spherical member 1 is placed on the chucks 15 of the CNC lathe. The cutting tool 16 can be positioned in the X–Y plane by conventional CNC control. However, the gear teeth must be machined so that they are all oriented radially outwards from the geometric center of the spherical member 1. In order to properly orient the gear teeth, the CNC lathe must be modified. As shown schematically in FIG. 6, the tool 16 is mounted to a rotatable tool holding device 17. By rotating the tool holding device by the proper angle, it is possible to maintain a proper orientation of the tool 16. In order for the tool to be properly oriented it should always face towards the geometric center of the spherical member 1. If a CNC lathe is modified to have a rotatable tool holding device, it is possible to computer control the orientation of the tool to cut the spiral teeth.

In order to control the motion of the robotic joint about a given axis it is necessary to control the individual motors to turn through the proper angle in order to rotate the spherical member 1 through a desired angle about a desired axis. In order to properly control the motors, it is necessary to understand the inverse kinematics of the joint. The inverse kinematics will be described below with reference to FIG. 7.

Figure 7:
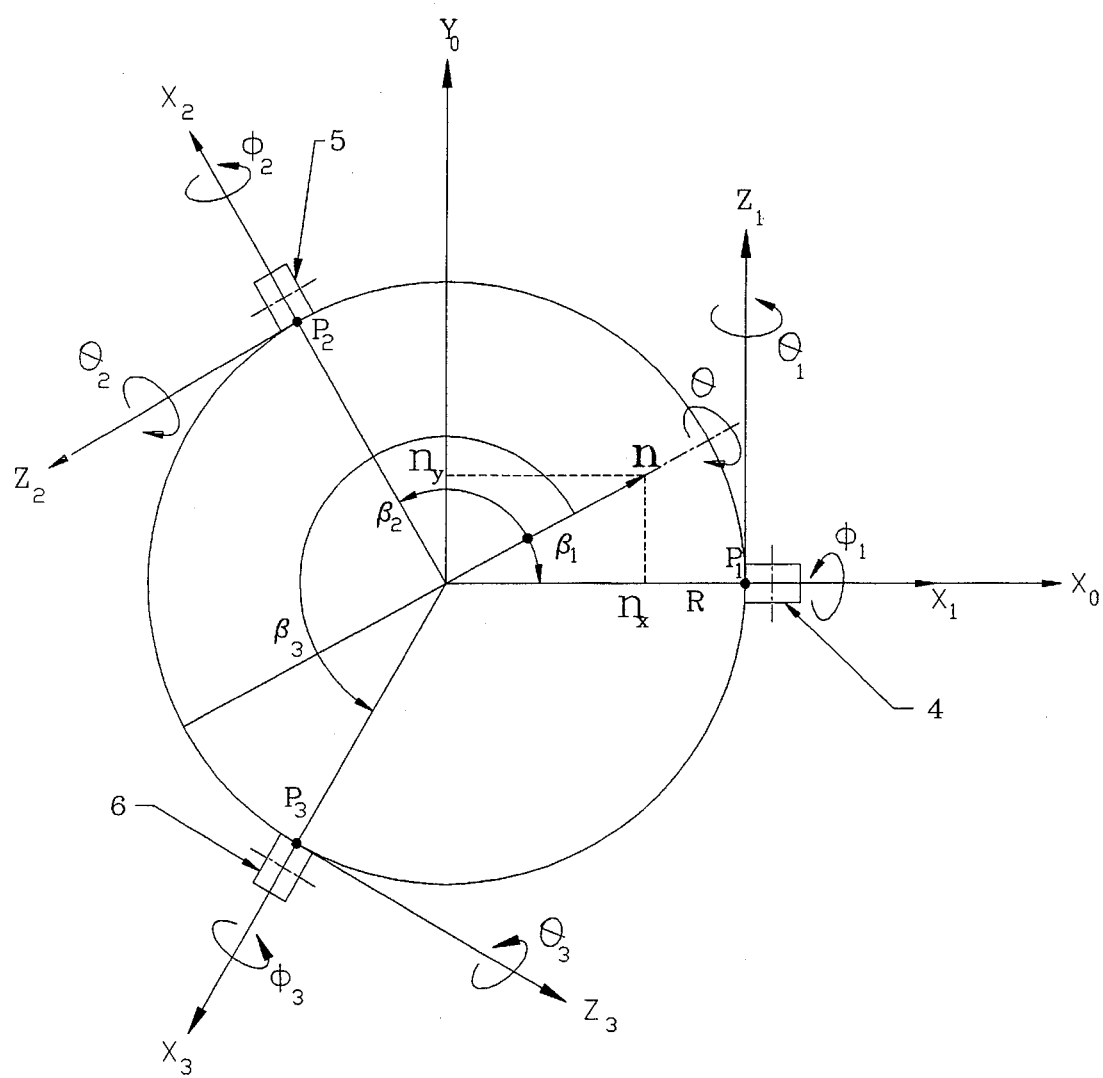
FIG. 7 is a schematic view showing the kinematics of the joint.

In FIG. 7 the joint is shown as having rotated by an angle θ about an arbitrary axis n in the horizontal plane. A fixed coordinate system $X_0$-$Y_0$ is defined with $X_0$ being aligned with drive mechanism 4. The arbitrary axis of rotation therefore has X and Y components $n_x$ and $n_y$ in the $X_0$-$Y_0$ coordinate system. Drive mechanism 4 has associated with it a coordinate system $x_1$-$z_1$ where $x_1$ is defined by a line from the geometric center of spherical member 1 passing through the drive gear 7 and $z_1$ is aligned with the axis of rotation of drive gear 7 and is fixed to drive gear 7. Similarly drive mechanism 5 has a coordinate system $x_2$-$z_2$ associated with it and drive mechanism 6 has a coordinate system $x_3$-$z_3$ associated with it. The angles between the coordinates $x_1$, $x_2$, $x_3$ associated with the drive members 4, 5, 6 respectively and the arbitrary axis of rotation n are defined as $\beta_1$, $\beta_2$, and $\beta_3$. The angles $\beta_1$, $\beta_2$, and $\beta_3$ can be calculated by the equations:

$$\beta_1 = \cos^{-1} n_x$$

$$\beta_2 = \beta_1 - \tfrac{2}{3}\pi$$

$$\beta_3 = \beta_1 - \tfrac{4}{3}\pi$$

In order for the spherical member 1 to rotate about axis n by an angle θ, the drive gears of the drive mechanisms 4, 5, 6 must rotate by angles $\theta_1$, $\theta_2$, and $\theta_3$ respectively. The angles $\theta_1$, $\theta_2$, and $\theta_3$ can be calculated by the equations:

$$\theta_1 = R/r \cos^{-1}(1 - n_y^2(1 - \cos\theta))$$

$$\theta_2 = R/r \cos^{-1}(1 - \gamma^2(1 - \cos\theta))$$

$$\theta_3 = R/r \cos^{-1}(1 - \eta^2(1 - \cos\theta))$$

where R is the pitch radius of the spherical member 1, r is the pitch radius of the drive gears 7 and γ and η are defined by the following equations:

$$\gamma = n_y \cos(\tfrac{2}{3}\pi) + n_x \sin(\tfrac{2}{3}\pi)$$

$$\eta = n_y \cos(\tfrac{4}{3}\pi) + n_x \sin(\tfrac{4}{3}\pi)$$

As was mentioned earlier, the drive mechanisms 4, 5, 6 must rotate about the axes $x_1$, $x_2$, $x_3$ as the spherical member rotates so that the gear teeth on drive gear 7 remain aligned with the gear teeth 2 on the spherical member 1. The angle through which the drive members 4, 5, 6 must rotate are shown in FIG. 7 as $\phi_1$, $\phi_2$, and $\phi_3$ respectively. These angles are not degrees of freedom in the system, but rather are determined by the kinematic constraints of the system. The angles $\phi_1$, $\phi_2$, and $\phi_3$ are determined by the equations:

$$\phi_1 = \tan^{-1}(\cos\beta_1 \tan\theta)$$

$$\phi_2 = \tan^{-1}(\cos\beta_2 \tan\theta)$$

$$\phi_3 = \tan^{-1}(\cos\beta_3 \tan\theta)$$

Knowing the inverse kinematic equations governing the joint, one of ordinary skill in the art could easily design a suitable controller to control the motion of the joints. A description of the controller hardware will not be given here as many suitable controllers are commercially available and one of ordinary skill in the art could easily select one. If it is desired to control the velocity of the motors, rather than displacement of the motors, then the above inverse kinematic equations would still apply and one would merely need to take their time derivative in order to arrive at equations for velocity.

The joint of the present invention is very versatile, being able to smoothly rotate about any axis of rotation in a horizontal plane. It is very compact compared to prior shoulder joints. Also it is very strong. Because of the intrinsic strength of the design, small motors can be used to hold or move heavy robot arms.

While preferred embodiments of the invention have been shown and described, it will be apparent to those skilled in the art that various modifications may be made without departing from the scope of the invention. Therefore, it is intended that the invention not be limited to the particular embodiments disclosed but that the scope of the invention be defined by the following claims.

We claim:

1. A spherical joint comprising:

a generally spherical member having a geometric center and an outer surface three drive means, each of which contacts said outer surface at a respective contact point, wherein said contact points and said geometric center are located within and define a plane, and wherein said drive means impart movement to said outer surface, whereby said spherical member is capable of being rotated about any axis of rotation which lies within said plane.

2. A spherical joint comprising:

a generally spherical member having a geometric center and an outer surface, said outer surface being formed with gear teeth therein, a plurality of drive gears, each of which mates with said gear teeth in said outer surface at a respective contact point, wherein said contact points and said geometric center are located within and define a plane, and wherein said drive means impart movement to said outer surface, whereby said spherical member is capable of being rotated about any axis of rotation which lies within said plane.

3. A spherical joint comprising:

a generally spherical member having a geometric center and an outer surface, said outer surface being formed with gear teeth therein, three drive means, each of which comprises a drive gear that mates with said gear teeth in said outer surface and which impart movement to said outer surface, whereby said spherical member is capable of being rotated about an infinite number of axes which pass through said geometric center.

4. The spherical joint of claim 3 wherein said plurality of drive means are in contact with said outer surface at a plurality of contact points, wherein said contact points and said geometric center are located within and define a plane, and wherein said spherical member is capable of being rotated about any axis of rotation which lies within said plane.

5. The spherical joint of claim 4 wherein said plurality of drive means consists of exactly three drive means.

6. The spherical joint of claim 5 further comprising control means to move each of said drive means through a predetermined displacement whereby said spherical member is rotated about a predetermined axis of rotation.

7. The spherical joint of claim 3 further comprising control means to move each of said drive means through a predetermined displacement whereby said spherical member is rotated about a predetermined axis of rotation.

8. The spherical joint of claim 3 wherein said spherical member has a longitudinal axis and said gear teeth are concentric with said longitudinal axis and extend completely around the periphery of said spherical member.

9. The spherical joint of claim 3 further comprising a plurality of drive motors each connected to a respective one of said drive gears.

10. The spherical joint of claim 9 wherein each of said drive motors is connected to a respective one of said drive gears via a speed reducing gear.

11. The spherical joint of claim 10 wherein said speed reduction gears are spur gears.

12. The spherical joint of claim 10 wherein said speed reduction gears are worm gears.

13. The spherical joint of claim 3 wherein each of said drive gears is rotatably mounted such that the gear teeth on said drive gear remain aligned with said gear teeth in said outer surface when said spherical member is rotated.

14. The spherical joint of claim 13 wherein each of said drive gears is rotatably mounted for rotation about an axis which passes through said geometric center of said spherical member and through the drive gear.

15. The spherical joint of claim 4 wherein said outer surface is formed with gear teeth therein and said drive means comprise drive gears which mate with said gear teeth in said outer surface.

16. The spherical joint of claim 15 wherein said spherical member has a longitudinal axis and said gear teeth are concentric with said longitudinal axis and extend completely around the periphery of said spherical member.

17. The spherical joint of claim 15 wherein each of said drive gears is rotatably mounted such that the gear teeth on said drive gear remains aligned with said gear teeth in said outer surface when said spherical member is rotated.

18. The spherical joint of claim 17 wherein each of said drive gears is rotatably mounted for rotation about an axis which passes through said geometric center of said spherical member and through the drive gear.

19. A robotic joint comprising:

a driven member which is rotated about an arbitrary axis of rotation n within an X–Y plane, said axis of rotation having X and Y components $n_x$ and $n_y$, three driving members, and control means which rotates said driven member through an angle $\theta$ about said axis of rotation by rotating the three driving members through angles $\theta_1$, $\theta_2$, and $\theta_3$ respectively, wherein the angles $\theta_1$, $\theta_2$, and $\theta_3$ are defined by the equations:

$$\theta_1 = C \cos^{-1}(1 - n_y^2(1 - \cos\theta))$$

$$\theta_2 = C \cos^{-1}(1 - \gamma^2(1 - \cos\theta))$$

$$\theta_3 = C \cos^{-1}(1 - \eta^2(1 - \cos\theta))$$

where C is a ratio of rotation in the driving members to rotation in the driven member and where $\gamma$ and $\eta$ are defined by the equations:

$$\gamma = n_y \cos(2/3\pi) + n_x \sin(2/3\pi)$$

$$\eta = n_y \cos(4/3\pi) + n_x \sin(4/3\pi).$$

20. The robotic joint of claim 19 wherein said driven member is a spherical member with gear teeth formed in the outer periphery thereof and said driving members are drive gears with teeth which are in driving contact with the gear teeth in the outer periphery of said spherical member.

* * * * *